US008346627B2

(12) United States Patent
Cirulli et al.

(10) Patent No.: US 8,346,627 B2
(45) Date of Patent: *Jan. 1, 2013

(54) METHOD, SYSTEM AND PROGRAM PRODUCT FOR APPROVING ITEM REQUESTS

(75) Inventors: Susan B. Cirulli, Aiken, SC (US); Danny R. Hager, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/358,076

(22) Filed: Jan. 25, 2012

(65) Prior Publication Data

US 2012/0123906 A1   May 17, 2012

Related U.S. Application Data

(63) Continuation of application No. 10/687,851, filed on Oct. 17, 2003, now Pat. No. 8,145,543.

(51) Int. Cl.
*G06Q 30/00* (2006.01)
(52) U.S. Cl. .................. 705/26.8; 705/27.1
(58) Field of Classification Search .............. 705/26, 705/27
See application file for complete search history.

(56) References Cited

U.S. PATENT DOCUMENTS

| 6,003,666 | A | 12/1999 | Dougherty |
| 6,049,785 | A | 4/2000 | Gifford |
| 6,910,018 | B1 | 6/2005 | Okada et al. |
| 7,117,165 | B1 | 10/2006 | Adams et al. |
| 7,131,071 | B2 | 10/2006 | Gune et al. |
| 7,350,698 | B2 | 4/2008 | Viswanath et al. |
| 2002/0013716 | A1 | 1/2002 | Dunham et al. |
| 2002/0059122 | A1 | 5/2002 | Inoue et al. |
| 2003/0139971 | A1 | 7/2003 | Rescigno et al. |
| 2003/0189600 | A1 | 10/2003 | Gune et al. |
| 2003/0204427 | A1 | 10/2003 | Gune et al. |

OTHER PUBLICATIONS

Office Action Communication for U.S. Appl. No. 10/687,851 dated Feb. 11, 2008, 17 pages.
Office Action Communication for U.S. Appl. No. 10/687,851 dated Oct. 15, 2009, 8 pages.
Office Action Communication for U.S. Appl. No. 10/687,851 dated Jul. 22, 2010, 11 pages.
Office Action Communication for U.S. Appl. No. 10/687,851 dated Jun. 3, 2011, 18 pages.
Notice of Allowance and Fee(s) Due for U.S. Appl. No. 10/687,851 dated Nov. 28, 2011, 7 pages.
Office Action Communication for U.S. Appl. No. 10/687,851 dated Aug. 10, 2007, 10 pages.
Office Action Communication for U.S. Appl. No. 10/687,851 dated Aug. 15, 2008, 21 pages.

(Continued)

*Primary Examiner* — Robert M. Pond
(74) *Attorney, Agent, or Firm* — William E. Schiesser; Hoffman Warnick LLC

(57) ABSTRACT

Under the present invention, an approver will log into a purchase application or the like. Upon logging in, the approver will be presented with a view of all item requests for which he/she must make an approval determination. The approver can also be presented with informational messages for the requested items. In any event, the approver can make an approval determination for the item requests and post comments related thereto. Once the approval determination has been made for a particular item request, an approver list and approval status corresponding thereto is updated. It should be understood that as used herein, the term "item" is intended to refer to goods or services.

20 Claims, 3 Drawing Sheets

OTHER PUBLICATIONS

Office Action Communication for U.S. Appl. No. 10/687,851 dated Feb. 23, 2009, 8 pages.

Office Action Communication for U.S. Appl. No. 10/687,851 dated Feb. 4, 2010, 10 pages.

Office Action Communication for U.S. Appl. No. 10/687,851 dated Dec. 20, 2010, 15 pages.

Gale Group Newsletter DB(TM), "Extensity 6 Launches in the UK," Jun. 25, 2002, 3 pages, M2 Presswire, Dialog File 636, No. 05300497.

METHOD, SYSTEM AND PROGRAM PRODUCT FOR APPROVING ITEM REQUESTS

CROSS-REFERENCE TO RELATED APPLICATIONS

This application is a continuation of currently pending U.S. patent application Ser. No. 10/687,851 filed on Oct. 17, 2003. The application identified above is incorporated herein by reference in its entirety for all that it contains in order to provide continuity of disclosure

FIELD OF THE INVENTION

The present invention generally relates to a method, system and program product for approving item requests. Specifically, under the present invention, an approver can approve or reject multiple item requests using a single interface within an application.

BACKGROUND OF THE INVENTION

In business, it has become common for employees to request goods and services to perform essential job functions. Such requests can include items ranging from stationery and business cards to actual goods (e.g., chemicals) needed for production. As businesses become more computer dependent, many item requests are made using one or more computer-based applications. For example, an employee seeking to order a particular item can log into a front-end system such as a purchasing application and browse available items for the item he/she needs. Upon locating the desired item, the employee can submit a request for the same. The request is often processed by a back-end system that interfaces with the appropriate item supplier.

Unfortunately, as efficient as computer-based item ordering can be, certain controls are typically desired. Specifically, a business often desires one or more levels of approval to be given before an item is actually ordered from a supplier. This prevents both unnecessary and unauthorized expenditure of resources. In many instances, several levels of approval are required. For example, if an employee is attempting to purchase a chemical, management might desire that the request not only be approved by the employee's supervisors, but also by financial and safety personnel.

To date, the approval process has been an off-line process. Specifically, when an item is requested by an employee, an electronic message (e.g., an e-mail) is typically sent to all applicable approvers. Without logging into the underlying purchase application. each approver will respond to the electronic message indicating their approval or rejection of the request. Once all necessary approvals are obtained, the item request is formally approved. This methodology can become burdensome for an approver who receives multiple item requests in any given time interval. In particular, the approver could be subject to an incessant barrage of electronic messages for each item request. Furthermore, the electronic messages do not typically include an abundance of information. Rather, the message might only identify the requestor, the requested item, a price and a quantity. However, additional information such as safety data, etc. could be extremely relevant in the approver's decision to approve or reject the request.

In view of the foregoing, there exists a need for a method, system and program product for approving item requests. Specifically, a need exists for a system in which an approver can approve or reject items requests upon logging into an underlying application. Further a need exists for an approver to be presented with a single view of all item requests for which he/she needs to make an approval determination. Still yet, a need exists for a system in which additional, relevant information can be presented to an approver for each item request.

SUMMARY OF THE INVENTION

In general, the present invention provides a method, system and program product for approving item requests. Specifically, under the present invention, an approver will log into a purchase application or the like. Upon logging in, the approver will be presented with a view of all item requests for which he/she must make an approval determination. The approver can also be presented with informational messages for the requested items, with which he/she must concur before approving or rejecting an item request. In any event, the approver can make an approval determination for the item requests and post comments related thereto. Once the approval determination has been made for a particular item request, an approver list and approval status corresponding thereto is updated.

A first aspect for the present invention provides a computer-implemented method for approving item requests, comprising: logging an approver into an application; displaying a view containing a set of item requests to the approver; receiving an approval determination for at least one of the set of item requests from the approver; and updating an approver list corresponding to the at least one of the set of item requests based on the approval determination.

A second aspect for the present invention provides a system for approving item requests, comprising: an item display system for displaying a view containing a set of item requests to an approver within an application; an approval determination system for receiving an approval determination for at least one of the set of item requests from the approver; and an update system for updating an approver list corresponding to the at least one of the set of item requests based on the approval determination.

A third aspect for the present invention provides a program product stored on a recordable medium for approving item requests, which when executed, comprises: program code for displaying a view containing a set of item requests to an approver within an application; program code for receiving an approval determination for at least one of the set of item requests from the approver; and program code for updating an approver list corresponding to the at least one of the set of item requests based on the approval determination.

Therefore, the present invention provides a method, system and program product for approving item requests.

BRIEF DESCRIPTION OF THE DRAWINGS

These and other features of this invention will be more readily understood from the following detailed description of the various aspects of the invention taken in conjunction with the accompanying drawings in which.

Is noted that the drawings of the invention are not to scale. The drawings are intended to depict only typical aspects of the invention, and therefore should not be considered as limiting the scope of the invention. In the drawings, like numbering represents like elements between the drawings.

BEST MODE FOR CARRYING OUT THE INVENTION

As indicated above, the present invention provides a method, system and program product for approving item requests. Specifically, under the present invention, an approver will log into a purchase application or the like. Upon logging in, the approver will be presented with a view of all item requests for which he/she must make an approval determination. The approver can also be presented with informational messages for the requested items, with which he/she must concur before approving or rejecting an item request. In any event, the approver can make an approval determination for the item requests and post comments related thereto. Once the approval determination has been made for a particular item request, an approver list and approval status corresponding thereto is updated. It should be understood that as used herein, the term "item" is intended to refer to goods or services.

Figure 1:
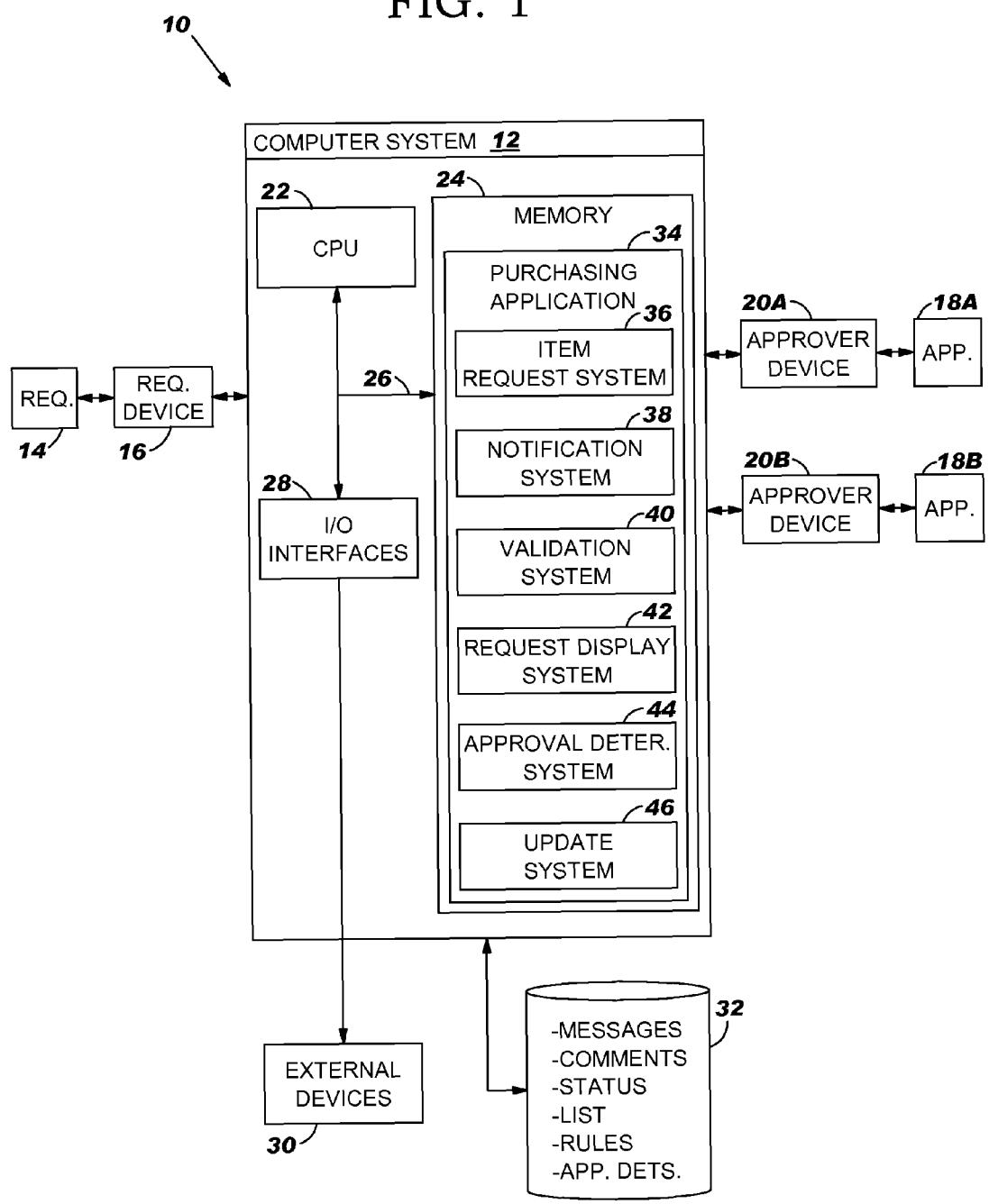
FIG. 1 depicts a system for approving item requests, according to the present invention.

Referring now to FIG. 1, a system 10 for approving item requests is shown. In general, requestor 14 will attempt to order items that are subject to approval by one or more approvers such as approvers 18A-B. It should be understood that two approvers 18A-B are shown for illustrative purposes only and that other variations could exist. In any event, as depicted, system 10 includes computer system 12, requestor device 16 and approver devices 20A-B. Requestor device 16 and approver devices 20A-B are intended to represent any type of computerized systems capable of communicating with computer system 12. For example, requestor device 16 and approver devices 20A-B could comprise personal computing devices such as a laptop, personal computer, hand held device, cellular phone, pager device, etc. Moreover, requestor device 16 and approver device 20A-B typically communicate with computer system 12 via a public network such as the Internet, or a private network such as a local area network (LAN), wide area network (WAN), a virtual private network (VPN), etc. To this extent, communication between computer system 12, requestor device 16 and approver devices 20A-B could occur in a client-server environment via a direct hard-wired connection (e.g., serial port), or via an addressable connection that may utilize any combination of wireline and/or wireless transmission methods. As such, the server and clients may utilize conventional network connectivity, such as Token Ring, Ethernet, WiFi or other conventional communications standards. Moreover, connectivity could be provided by conventional TCP/IP sockets-based protocol. In this instance, the clients would utilize an Internet service provider to establish connectivity to the server. It should be understood, however, that the architecture shown in FIG. 1 is intended to be illustrative only and that other variations are possible. For example, requestor 14 and approvers 18A-B could access computer system 12 directly, without their own individual "devices."

As depicted, computer system 12 generally includes central processing unit (CPU) 22, memory 24, bus, 26, input/output (I/O) interfaces 28, external devices/resources 30, and storage unit 32. CPU 22 may comprise a single processing unit, or be distributed across one or more processing units in one or more locations, e.g., on a client and server. Memory 24 may comprise any known type of data storage and/or transmission media, including magnetic media, optical media, random access memory (RAM), read-only memory (ROM), a data cache, a data object, etc. Storage unit 32 may comprise any type of data storage for providing more static storage of data used in the present invention. As such, storage unit 32 may include one or more storage devices, such as a magnetic disk drive or an optical disk drive. Moreover, similar to CPU 22, memory 24 and/or storage unit 32 may reside at a single physical location, comprising one or more types of data storage, or be distributed across a plurality of physical systems in various forms. To this extent, memory 24 and/or storage unit 32 can include data distributed across, for example, a LAN, WAN or a storage area network (SAN) (not shown).

I/O interfaces 28 may comprise any system for exchanging information to/from one or more external devices 22. External devices 30 may comprise any known type of external device, including speakers, a CRT, LED screen, hand held device, keyboard, mouse, voice recognition system, speech output system, printer, monitor/display, facsimile, pager, etc. Bus 26 provides a communication link between each of the components in computer system 12 and likewise may comprise any known type of transmission link, including electrical, optical, wireless, etc. In addition, although not shown, additional components, such as cache memory, communication systems, system software, etc., may be incorporated into computer system 12. It is understood that requestor device 16 and approver devices 18A-B typically include the same components (e.g., CPU, memory, etc.) as shown and described with reference to computer system 12. These components have not been separately shown or discussed for brevity.

Shown in memory 24 is purchasing application 34, which can incorporate some or all of any existing application that requestor 14 can operate to request items for purchase. To this extent, when requestor 14 wishes to request an item, he/she will be validated by validation system 40 (e.g., via a user name and password) and log into purchasing application 34. Once logged in, requestor 14 will interface with item request system 36 to select items for purchase. In a typical embodiment, item request system 36 is configured to allow requestor 14 to browse one or more lists of available items, and select the desired items. To this extent, item request system 36 could allow requestor 14 to select multiple items in a "shopping cart" format. Regardless, once requestor 14 has selected one or more items, item request system 36 will generate an item request. If a single item has been requested, or multiple items have been selected within a single "shopping cart," a single item request could be generated. However, this need not be the case as each selected item could result in a separate item request.

Once an item request has been generated, it must be approved by all applicable approvers 18A-B before the purchase is allowed. Under the present invention, approval of an item request is an on-line process, meaning that approvers 18A-B will log into purchasing application 34 to make approval determinations. In one embodiment, notification system 38 will build an approver list that identifies all approvers (e.g., 18A-B) who must approve of each item request. In this embodiment, notification system 38 could access a set of rules or policies in storage unit 32 that dictates which approvals must be given for particular items. For example, if requestor 14 is attempting to purchase a chemical, the rules could dictate that requestor 14's supervisor (e.g., 18A) and a safety manager (e.g., 18B) must approve the item request. Once all applicable approvers 18A-B are identified, notification system 38 can send an approval message to the first required approver (e.g., approver 18A) on the list informing him/her that an item request requiring approval has been made. Typically, the approval message is electronic such as an electronic mail or instant message. Further, the approval message could include a hyperlink or the like that will bring approver 18A to a login interface of purchasing application 34 (e.g., as provided by validation system 40). In sending an approval message, notification system 38 can be configured to transmit an approval message each time an item request is made, or at predetermined time intervals (e.g., daily). It should be understood, however, that approval messages are not required under the present invention. Rather, approver 18A could periodically log into purchasing application 34 at their leisure to see if any item requests requiring their approval have been made.

Figure 2:
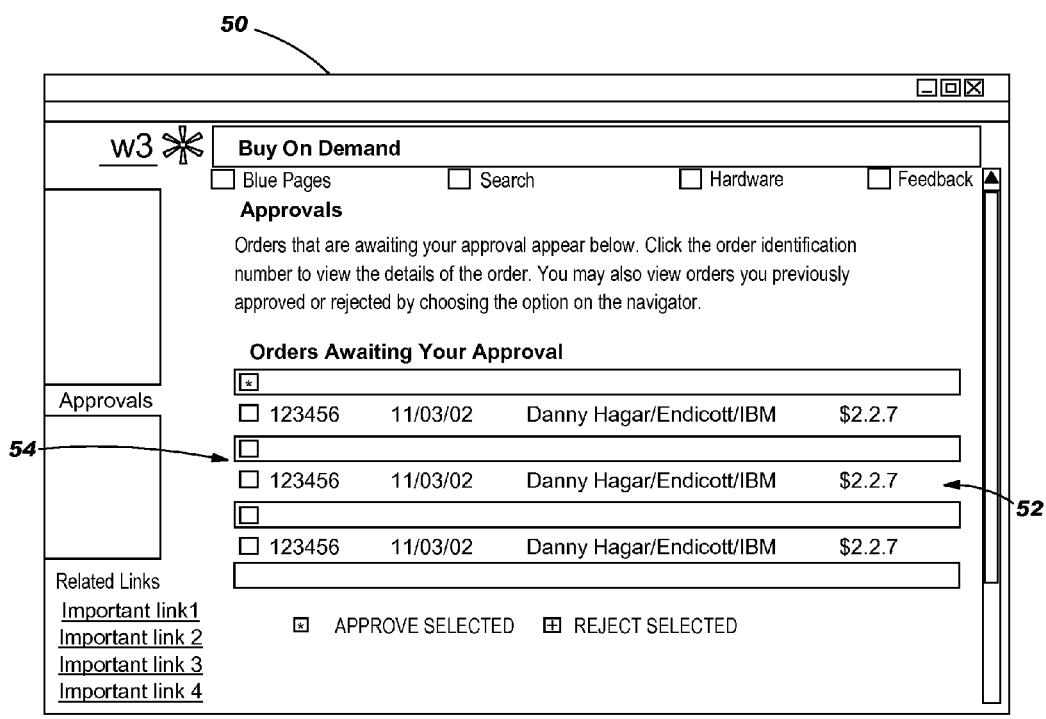
FIG. 2 depicts an illustrative view of item requests, according to the present invention.

In any event, after approver 18A is authenticated by validation system 40, approver 18A can be subject to further screening. For example, validation system 40 could check an employee database to ensure that approver 18A is authorized to make approval determinations. It could be the case that approver 18A no longer has such permission within the business, even though he/she could still gain access to purchasing application 34. Assuming approver 18A is validated and authorized, request display system 42 will display a view of item requests to approver 18A. The view will not only include the item request made by requestor 14, but also all other item requests that are pending for which approver 18A must make an approval determination. Referring to FIG. 2, an illustrative view of item requests 50 is depicted. As shown, view of 50 lists a set (e.g., one or more) of item requests 52. By checking check boxes 54, item requests can be individually approved. Therefore, view 50 allows approver 18A to view and individually approve or reject all item requests. It should be understood that an entire shopping cart of items could be presented in view 54 as one item request 52. In addition, although not shown, request display system 42 (FIG. 1) could display one or more informational messages for approver 18A. Such informational messages could include, for example, relevant safety data about the requested item. For example, if an item being requested is a chemical, the following informational message could be displayed. "This is a chemical item and should only be delivered to a building that can house toxic chemicals. Your clicking on the 'Next' button signifies concurrence." If the approver does not concur, the item request cannot be approved or rejected.

Referring back to FIG. 1, any approval determinations (e.g., to approve or reject) made by approver 18A will be received by approval determination system 44 and possibly stored in storage unit 32. In making an approval determination, approval determination system 44 could also provide approver 18A with the capability to post comments regarding his/her determination. For example, if approver 18A rejected the item request, approvers 18A could post a comment indicating the reason(s). Once an approval determination is received, update system 46 will update the approver list and approval status corresponding to the item request. As described above, the approver list identifies all approvers 18A-B that must approve an item request. In the example discussed above in conjunction with FIG. 1, the approver list would include approver 18A and approver 18B. Once approver 18A has made an approval determination, the approver list would be updated to reflect this fact. Similarly, the approval status corresponding to the particular item request could be updated. Under the present invention, there are several possible approval status's (e.g., pending, rejected and approved). For example, if approver 18A rejected the item request, the approval status would be changed to rejected. In this event, the process would end and approval from approver 18B need not be requested. Conversely, upon issuing the item request, and before approval by approvers 18A-B, the approval status would be "pending." After both approvers 18A-B have approved the item request, the status would be changed to "approved."

Assuming approver 18A has approved the item request issued by requestor 14, an approval determination would then be sought by the next approver on the approver list (e.g., approver 18B) in a similar manner. Specifically, notification system 38 could forward the approval message thereto (or generate and send a new approval message). Upon receipt, approver 18B could log into purchasing application 34. After a validation and authorization check by validation system 40, request display system 42 would display a view containing a set of item requests for which approver 18B is asked to make an approval determination. Further, any informational message relevant to approver 18B's approval could be displayed. When approver 18B makes an approval determination for the item request, the approval determination is received by approval determination system 44, which also provides approver 18B with the capability to post any comments relating thereto. Further, update system 46 will update the approver list and approval status accordingly. If approver 18B was the final approver on the approval list, and all approvers 18A-B approved of the item request by requestor 14, the approval status would change from "pending" to "approved."

Once any approver has made an approval determination, notification system 38 can communicate a result message to requestor 14 and/or other approvers. Alternatively, a result message could be communicated only when an approver has rejected an item request.

Figure 3:
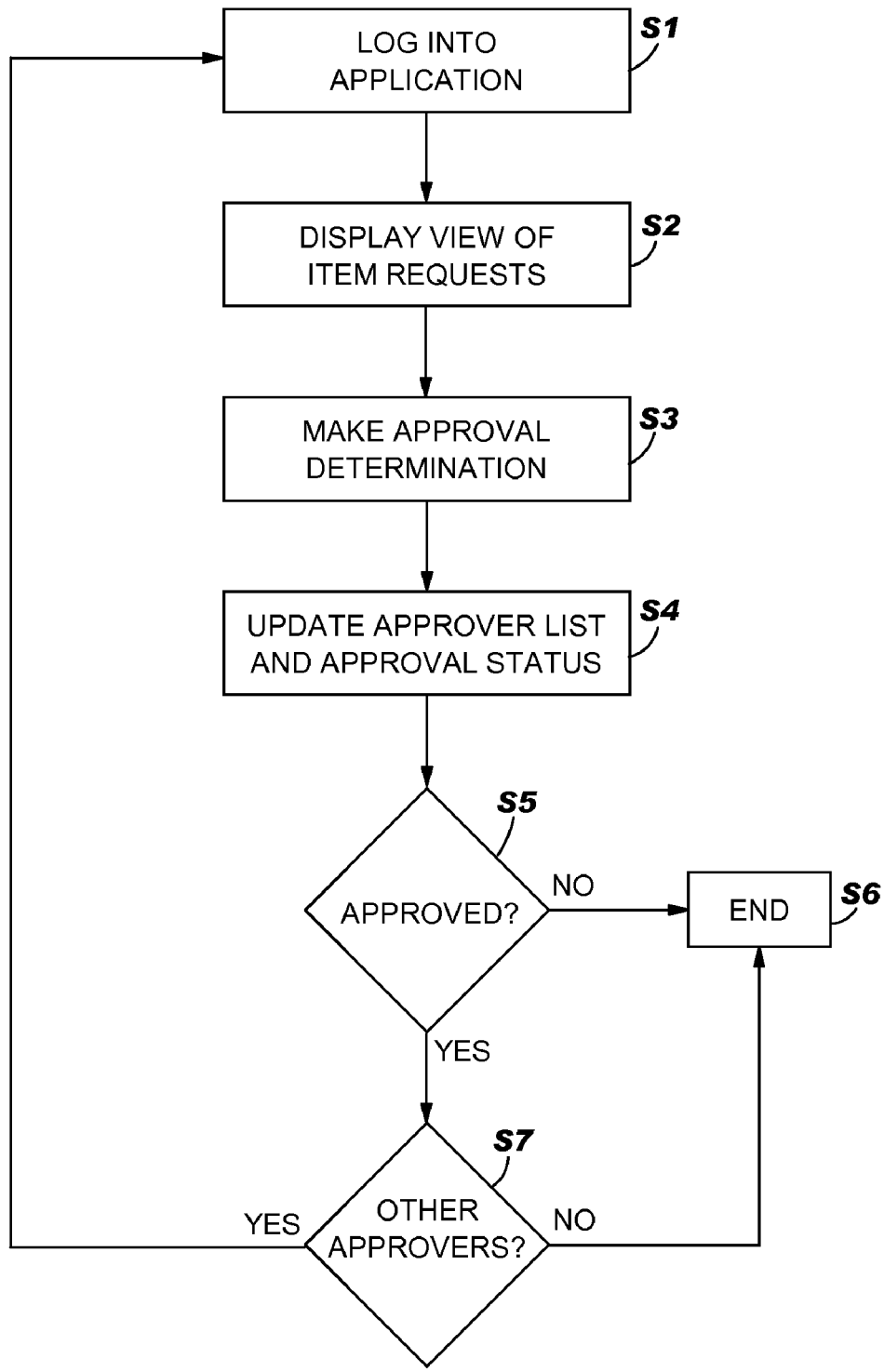
FIG. 3 depicts a method flow diagram, according to the present invention.

Referring now to FIG. 3, a method flow diagram 100 according to the present invention is depicted. As shown, first step S1 of method is for an approver to log into an application. Upon login, second step S2 is to display a view containing a set of item requests to the approver. Third step S3 is to make an approval determination for at least one of the item requests in the view. Fourth step S4 is to update the approver list and approval status corresponding to the item request(s) based on the approval determination(s). In fifth step S5, it is determined whether the issue request was approved. If not, the process is ended in step S6. If so, it is determined whether approval by another approver is required in step S7. If so, the process is repeated for that subsequent approver. If not, the process is ended in step S6.

It is understood that the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A system for approving item requests, comprising:
a memory; and
a processor being configured to:
receive an item request for an item from a requestor;
dynamically generate an approval list for the item request based on application of a set of rules to the item, the set of rules including item-based rules and safety-based rules, the approval list being a hierarchy of approvers that includes all approvers, including all supervisors, financial personnel and safety personnel, from which approval must be obtained;
automatically determine an approver and any subsequent approver from the hierarchy based on an item in an item request, the subsequent approver being someone from whom approval must be obtained subsequent to approval being obtained from the approver;
log the approver into an application used to make item requests;
display by the application a view containing a set of item requests to the approver containing all item requests from all requestors for which approval is requested from the approver, the set of item requests including a plurality of item requests from a plurality of requesters;
receive an approval determination for at least one of the set of item requests from the approver, wherein the receiving is adapted to receive a plurality of approval determinations from the approver simultaneously;
update an approver list corresponding to the at least one of the set of item requests based on the approval determination,
in case that the hierarchy contains any subsequent approver and the approval determination by the approver is that of the at least one of the set of item requests being approved, automatically forward an approval message to the subsequent approver in the approver list after the updating step.

2. The system of claim 1, wherein the set of item requests comprises a plurality of item requests.

3. The system of claim 1, wherein the set of item requests exist within a shopping cart, and wherein the approval determination from the approver corresponds to the shopping cart as a whole.

4. The system of claim 1, wherein the approval determination includes comments from the approver based on the approval determination.

5. The system of claim 1, wherein the view further displays an informational message to the approver.

6. The system of claim 1, further comprising a notification system for communicating an approval message to the approver, wherein the approval message informs the approver of the set of item requests requiring approval, and wherein the notification system further forwards the approval message to a subsequent approver in the approver list after the approver list is updated.

7. The system of claim 6, wherein the notification system further communicates a result message to a requestor based on the approval determination.

8. The system of claim 1, further comprising a validation system for logging the approver into the application, and for verifying an authorization of the approver to make the approval determination.

9. The system of claim 1, wherein the update system further updates an approval status corresponding to the at least one item request, and wherein the approval status is selected from the group consisting of approved, rejected and pending.

10. The system of claim 1, wherein the approver list identifies approvers that have approved the at least one item request, and approvers that have yet to approve the at least one item request.

11. A program product stored on a computer readable storage medium for approving item requests, which when executed, comprises:
program code for receiving an item request for an item from a requestor;
program code for dynamically generating an approval list for the item request based on application of a set of rules to the item, the set of rules including item-based rules and safety-based rules, the approval list being a hierarchy of approvers that includes all approvers, including all supervisors, financial personnel and safety personnel, from which approval must be obtained;
program code for automatically determining an approver and any subsequent approver from the hierarchy based on an item in an item request, the subsequent approver being someone from whom approval must be obtained subsequent to approval being obtained from the approver;
program code for logging the approver into an application used to make item requests;
program code for displaying by the application a view containing a set of item requests to the approver containing all item requests from all requestors for which approval is requested from the approver, the set of item requests including a plurality of item requests from a plurality of requesters;
program code for receiving an approval determination for at least one of the set of item requests from the approver, wherein the receiving is adapted to receive a plurality of approval determinations from the approver simultaneously;
program code for updating an approver list corresponding to the at least one of the set of item requests based on the approval determination; and
program code for, in case that the hierarchy contains any subsequent approver and the approval determination by the approver is that of the at least one of the set of item requests being approved, automatically forwarding an approval message to the subsequent approver in the approver list after the updating step.

12. The program product of claim 11, wherein the set of item requests comprises a plurality of item requests.

13. The program product of claim 11, wherein the set of item requests exist within a shopping cart, and wherein the approval determination from the approver corresponds to the shopping cart as a whole.

14. The program product of claim 11 wherein the program code for receiving the approval determination further receives comments from the approver based on the approval determination.

15. The program product of claim 11, wherein the program code for displaying further displays an informational message to the approver.

16. The program product of claim 11, further comprising program code for communicating an approval message to the approver, wherein the approval message informs the approver of the set of item requests requiring approval, and wherein the approval message is forwarded to a subsequent approver in the approver list after the approver list is updated.

17. The program product of claim 11, wherein the program code for communicating further communicates a result message to a requestor based on the approval determination.

18. The program product of claim 11, further comprising program code for logging the approver into the application, and for verifying an authorization of the approver to make the approval determination.

19. The program product of claim 11, wherein program code for updating further updates an approval status corresponding to the at least one item request, and wherein the approval status is selected from the group consisting of approved, rejected and pending.

20. The program product of claim 11, wherein the approver list identifies approvers that have approved the at least one item request, and approvers that have yet to approve the at least one item request.

* * * * *